(12) United States Patent
Arnold

(10) Patent No.: US 7,884,156 B2
(45) Date of Patent: Feb. 8, 2011

(54) ELASTOMER COMPOSITIONS WITH CARBON BLACK

(75) Inventor: Jesse J. Arnold, Simpsonville, SC (US)

(73) Assignees: Michelin Recherche et Technique, Granges-Paccot (CH); Societe de Technologie Michelin, Clermont-Ferrand (FR)

( * ) Notice: Subject to any disclaimer, the term of this patent is extended or adjusted under 35 U.S.C. 154(b) by 700 days.

(21) Appl. No.: 11/742,871

(22) Filed: May 1, 2007

(65) Prior Publication Data

US 2008/0110552 A1     May 15, 2008

Related U.S. Application Data

(63) Continuation of application No. PCT/US2006/044070, filed on Nov. 13, 2006.

(51) Int. Cl.
*C08K 3/04* (2006.01)
*B60C 1/00* (2006.01)

(52) U.S. Cl. .............. 524/496; 524/495; 524/571; 524/574; 524/575.5; 152/905; 423/449.1

(58) Field of Classification Search .............. 524/495, 524/496; 423/449.1
See application file for complete search history.

(56) References Cited

U.S. PATENT DOCUMENTS

| | | | |
|---|---|---|---|
| 4,360,627 A | 11/1982 | Okado et al. | |
| 4,477,621 A * | 10/1984 | Sato et al. | 524/496 |
| 4,822,844 A | 4/1989 | Kawakami et al. | |
| 5,456,750 A | 10/1995 | Mackay et al. | |
| 6,150,453 A | 11/2000 | Mahmud et al. | |
| 2005/0222318 A1 | 10/2005 | Chauvin | |
| 2005/0256249 A1 | 11/2005 | Wang et al. | |

FOREIGN PATENT DOCUMENTS

FR       2721038       12/1995

OTHER PUBLICATIONS

Cabot Industrial Products, "Effect of Carbon Black Morphology on Dispersion (Part II)," Sep. 2001.

* cited by examiner

*Primary Examiner*—Vickey Nerangis
(74) *Attorney, Agent, or Firm*—Frank J. Campigotto

(57) ABSTRACT

An elastomer composition includes an elastomer and a carbon black, wherein the carbon black is characterized as having a COAN of between about 90 and 150 ml/100 g, a BET of between 50 and 69 m$^2$/g and a distribution index DI that is greater than 1.15, wherein the DI is a ratio of $d_w$ to $d_{mode}$. In particular embodiments, the elastomer may be selected from one or more natural rubbers, one or more synthetic rubbers or combinations thereof. For example, the one or more synthetic rubbers may be selected from styrene butadiene rubber, butadiene rubber, polyisoprene rubber, butyl rubber or combinations thereof. Products made from the elastomer composition include tires and other products, particularly tires that include a sidewall, a carcass, a carcass reinforcement, tread and/or an undertread comprising the elastomeric composition.

20 Claims, 1 Drawing Sheet

ELASTOMER COMPOSITIONS WITH CARBON BLACK

This application is a continuation of International Application No. PCT/US2006/044070, filed Nov. 13, 2006.

BACKGROUND OF THE INVENTION

1. Field of the Invention

This invention relates generally to elastomer compositions having carbon black and more particularly, to elastomer compositions useful for tires and their components.

2. Description of the Related Art

Carbon blacks are widely used as pigments, fillers and reinforcing agents in the compounding and preparation of rubber and other elastomeric compounds. These materials are particularly useful as reinforcing agents in the preparation of elastomeric compounds used in the manufacture of tires.

A furnace-type reactor produces carbon black by pyrolyzing a hydrocarbon feedstock with hot combustion gases. The pyrolysis combustion products include particulate aggregates of carbon black particles. Carbon blacks are generally characterized on the basis of their physical characteristics, including, but not limited to, particle size and specific surface area; aggregate size, shape and distribution; and chemical and physical properties of the surface.

Carbon blacks are classified according to a standard classification system provided under ASTM designation D1765. In accordance with this standard, rubber grade carbon blacks are classified using a four-character nomenclature: the first character gives an indication of the influence of the carbon black on the rate of cure of a typical rubber compound containing the carbon black; the second character, the group number, gives information on the average surface area of the carbon black and the last two characters are assigned arbitrarily. Thus, for example, an N347 carbon back describes, with the "N," a carbon black that has a normal effect on the cure rate and, with the group number "3," indicates a carbon black having an average nitrogen surface area of between 70 and 99 $m^2/g$.

In the manufacture of tires, carbon blacks are selected for use in the tires based upon the preferred characteristics of the rubber mix. For example, a truck tire tread may be manufactured from a rubber mix containing a carbon black having the physical properties of a rubber black assigned to the N200 classification series. By contrast, the carcass of the tire may be manufactured from a rubber mix containing a carbon black having the physical properties of the N600 carbon black classification series. Such selections are made based upon the known effects that different classes of carbon black have on the physical properties of the rubber such as, for example, the hysteresis and rigidity of the mix.

Carbon black is not the sole reinforcing agent or filler that may be used in a tire manufacturing elastomer compound. For example, silica may be added to an elastomer compound to replace some or all of the carbon black and thereby enhance certain performance characteristics. The use of silica as a reinforcing agent in the elastomer mix does, however, have some drawbacks in that the resulting elastomer compound may exhibit low thermal conductivity, high electrical resistivity, high density and poor processability.

SUMMARY OF THE INVENTION

The present invention provides elastomer compositions and products made from the elastomer composition. In a particular embodiment of the present invention, an elastomer composition includes an elastomer and a carbon black, wherein the carbon black is characterized as having a COAN of between about 90 and 150 ml/100 g, a BET of between 50 and 69 $m^2/g$ and a distribution index DI that is greater than 1.15, wherein the DI is a ratio of $d_2$ to $d_{mode}$.

In particular embodiments, the elastomer may be selected from one or more natural rubbers, one or more synthetic rubbers or combinations thereof. For example, the one or more synthetic rubbers may be selected from styrene butadiene rubber, butadiene rubber, polyisoprene rubber, butyl rubber or combinations thereof.

In particular embodiments, the COAN may range between about 95 and 120 ml/100 g. Embodiments may include the carbon black being characterized as having a ratio of L to $d_{mode}$ that is between about 0.7 and about 1.5. Alternatively, the L to $d_{mode}$ ratio may be between greater than 0.8 and less than 1.2.

The carbon black loadings in elastomeric compositions according to the present invention are not limited but may, for example, range between about 20 and about 200 pounds per hundred pounds of the elastomer.

Other embodiments of the present invention include tires and other products that comprise the elastomeric composition described above. In particular embodiments, a tire includes a sidewall, a carcass, a carcass reinforcement, tread and/or an undertread comprising the elastomeric composition described above.

Embodiments of the present invention further include methods for making a tire. Such methods include the steps of mixing the elastomer composition described above, forming one or more tire components comprising the mixed elastomer composition and assembling the tire, the tire comprising the one or more tire components comprising the mixed elastomer composition. The method may further comprise curing the tire. The one or more components may be selected, for example, from tread, undertread, carcass, carcass reinforcement and combinations thereof.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION OF PREFERRED EMBODIMENTS

Figure 1:
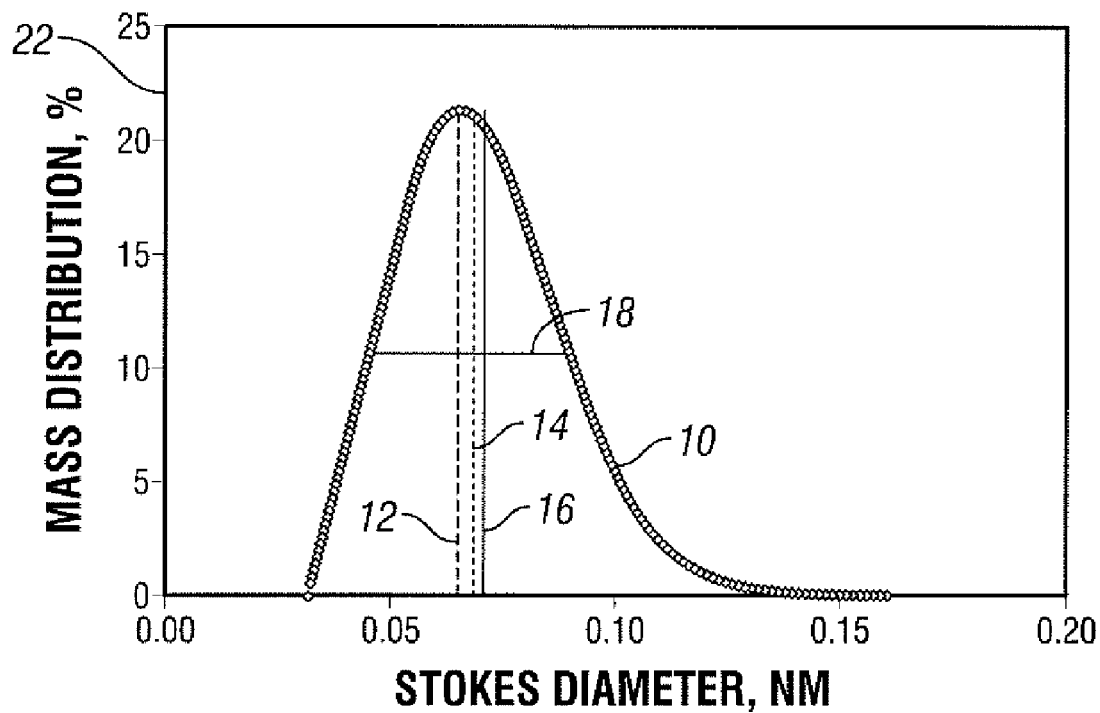
FIG. 1 is a graph of a distribution curve for a sample of carbon black plotting the frequency of mass distribution against the Stokes diameter.

Carbon blacks are described by their many different physical properties that are determined by standard methods well known to those having ordinary skill in the art. The properties of a given carbon black depend upon the conditions of manufacture and may be modified by altering, for example, the temperature, pressure, feedstock, residence time, quench temperature and throughput of the manufacturing process.

Table 1 provides a list of carbon black physical properties with corresponding test methods used to determine each of the listed properties. Unless otherwise stated, all physical properties of the carbon blacks used in accordance with the present invention are measured by the methods shown in Table 1.

TABLE 1

Characteristics Descriptive of Carbon Blacks and
their Methods of Determination

| Physical Characteristic | Called | Units | Method |
|---|---|---|---|
| Surface Area by Nitrogen Adsorption | BET | m²/g | ASTM D6556 |
| Surface Area by cetyl-trimethyl ammonium bromide | CTAB | m²/g | ASTM D3765 |
| Oil Adsorption Number | OAN | ml/100 g | ASTM D2414 |
| Compressed Oil Adsorption Number | COAN | ml/100 g | ASTM 3493 |
| Carbon Black Classification | N | | ASTM D1765 |
| Iodine Adsorption Index | IA | mg/g | ASTM D1510 |

The present invention provides an elastomer composition having a carbon black with a surface area measured by BET nitrogen adsorption of between 50 and 69 m²/g. Under ASTM designation D1765, which provides the standard classification system for carbon blacks used in rubber products, a carbon black classified in the N400 series is one having, inter alia, an average BET nitrogen surface area of between 50 and 69 m²/g.

The carbon blacks useful in accordance with the present invention may further be characterized as comprising agglomerates of particles having Stokes diameters that fall within a particular distribution. The distribution of the diameters of the aggregates of a carbon black are measured by means of a centrifugal photosedimentometer of the type "DCP" (Disk Centrifuge Photosedimentometer), sold by Brookhaven Instruments. The operating method for these measurements is as follows:

A sample of carbon black is dried, in accordance with standard JIS K6221 (1975). Then 10 mg of carbon black thus dried is suspended in 40 ml of an aqueous solution of 15 vol. % ethanol and 0.05 vol. % of a non-ionic surfactant.

The dispersion of the carbon black is obtained by ultrasound treatment for 10 minutes, by means of a 600 Watt ultrasonic probe. To this end an ultrasonic generator designated "Vibracell ½ inch" sold by Bioblock and adjusted to 60% of its power (namely to 60% of a maximum amplitude) is used.

A gradient solution composed of 15 ml water (with 0.05% non-ionic surfactant) and 1 ml ethanol is injected into the disc of the photosedimentometer, rotating at 8,000 RPM, then 0.30 ml of the suspension of carbon black is injected on to the surface of the gradient solution. The mass size distribution curve is recorded for 120 minutes. A software program provides the values for $d_2$, $d_{mode}$, L and $d_{50\%}$.

FIG. 1 is a graph of a distribution curve for a sample of carbon black plotting the frequency of mass distribution against the Stokes diameter. The distribution curve 10 is generated by plotting the frequency of mass distribution in weight percent against the Stokes diameter as described above. The $d_{mode}$ 12 then represents the Stokes diameter at the peak of the distribution curve 10. The $d_{50\%}$ 14 represents the median, wherein half of the distribution is above $d_{50\%}$ and half of the distribution is below $d_{50\%}$. L 18 is the difference between the Stokes diameters that correspond to the one and only frequency of mass distribution 22 that is equal to 50% of the maximum frequency $d_{mode}$ 12 of the Stokes diameters.

The weighted average diameter $d_w$ 16 is a weighted average diameter that may be determined from the distribution curve by the following equation (1):

$$d_w = \Sigma(n_i d_i^5 / n_i d_i^4), \quad (1)$$

wherein i is the sample number (typically running from 1 to 100), n is the frequency of the mass distribution given in weight percent and d is the corresponding Stokes diameter. The weighted average $d_w$ emphasizes the importance of the larger diameter particles by raising the diameters to the exponents shown.

As stated above, the carbon blacks useful in accordance with the present invention may further be characterized as comprising agglomerates of particles having Stokes diameters that fall within a particular distribution. Specifically, the carbon black may be characterized as having a distribution index (DI) that is greater than 1.15. The DI is the ratio of $d_w$ to $d_{mode}$, wherein $d_{mode}$ for a given sample of carbon black is the Stokes diameter at the peak of the distribution of the diameters and $d_w$ is determined by equation (1) as described above. Particular embodiments of the present invention include carbon blacks having a DI that is greater than 1.2 with other embodiments having a DI that is greater than about 1.4. Particular embodiments include carbon blacks having a DI that ranges between greater than 1.15 and about 1.60 or as high as about 2.5 but such maximums are provided only as examples and are not meant to otherwise limit the invention.

Particular embodiments of the present invention further include carbon blacks that may be characterized as having an $L/d_{mode}$ ratio of between about 0.7 and about 1.5. Other embodiments may have an $L/d_{mode}$ ratio of between greater than 0.8 and about 1.5 while others may have a carbon black having an $L/d_{mode}$ ratio of between greater than 0.8 and 1.2.

More specifically, the carbon black used in the elastomer composition of the present invention may be characterized as having, inter alia, a BET total nitrogen surface area of between 50 and 69 m²/g. In particular embodiments, the BET total nitrogen surface area may be between about 55 and about 65 m²/g while in other particular embodiments, between about 57 and about 63 m²/g. Particular embodiments of the present invention include a carbon black that may also be characterized as having a Compressed Oil Adsorption Number (COAN) of between about 90 and 150 ml/100 g. Other embodiments include a carbon black having a COAN of between about 95 and 120 ml/100 g while still other embodiments may range between about 97 and 115 ml/100 g.

In particular embodiments of the present invention, the carbon black may further be characterized as having an iodine adsorption number of between about 50 and about 60 mg/g and/or an Oil adsorption Number (OAN) of between about 150 and about 170 ml/100 g. Other particular embodiments include a carbon black having an OAN of between about 155 and about 175 ml/100 g.

The compounding amount of the carbon black in the elastomer composition is not limited. In particular embodiments of the present invention, the compounding amount of the carbon black may be between about 10 and about 200 parts by weight based on 100 parts by weight of elastomer. Useful ranges of carbon black loading may include between 30 and 70 phr in some embodiments of the present invention and between 35 and 65 phr.

Particular embodiments of the present invention may include only carbon black as a reinforcement filler having properties in accordance with the present invention or alternatively in a blend with a reinforcing organic filler and/or a reinforcing inorganic filler. Particular embodiments of the present invention that are characterized as having a blend of reinforcing fillers comprise the carbon black having properties in accordance with the present invention in a weight fraction that is greater than 50% or alternatively, greater than 70% of the blend of reinforcing fibers.

As noted above, while particular embodiments of the present invention do not include any silica as a reinforcing filler, it is contemplated that other embodiments may include some silica. The silica may be added to such compositions in quantities that are either smaller or larger than the quantity of carbon black added to the composition but as noted above, would typically be less than 50 wt. % of the reinforcement filler blend.

Surprisingly, particular embodiments of the present invention include elastomer compositions that have both low hysteresis and high rigidity with good tear resistance, which is a combination of physical characteristics that typify an elastomer composition having a significant amount of silica as reinforcement filler. As noted above, particular embodiments of the present invention include modifications of elastomer compositions that have had all or part of their silica content replaced with a carbon black suitable for use in accordance with the present invention. Advantageously, these modified elastomer compositions still retain their physical characteristics of low hysteresis, high rigidity and good tear resistance even after replacement of the silica with the carbon black. Furthermore, these modified elastomer compositions have advantageously substituted a less expensive component (carbon black) for a more expensive component (silica and/or silane) while also, at least in some embodiments, reducing or eliminating the problems that are associated with silica in an elastomer composition.

Suitable elastomers that may be used in the elastomer composition of the present invention include, for example, one or more natural rubbers, one or more synthetic rubbers or combinations thereof. Synthetic rubbers may include, without limitation, styrene-butadiene rubbers, butyl rubbers, polyisoprenes, polybutadienes and ethylene propylene terpolymers. The synthetic rubbers may include, but are not limited to, polymers, e.g., homopolymers, copolymers, and terpolymers, that are manufactured from 1,3 butadiene, styrene, isoprene, isobutylene, 2,3-dimethyl-1,3 butadiene, acrylonitrile, ethylene, propylene, and the like.

The elastomer composition of the present invention may include other components such as, for example, curing agents, reinforcing fillers, coupling agents, various processing aids, oil extenders, antidegradents, antioxidants or combinations thereof as known to those having ordinary skill in the art. Curing agents that may be included in the elastomer composition of the present invention are, for example, sulfur, sulfur donors, activators, accelerators, peroxides, and other systems used to effect vulcanization of the elastomer composition.

The elastomer composition disclosed herein may be used for various elastomeric products such as a tread compound, undertread compound, sidewall compound, wire skim compound, inner liner compound, bead, apex, any compound used in a tire carcass, including carcass reinforcement and in other components for tires, industrial rubber products, seals, timing belts, power transmission belting, and other rubber goods. As such, the present invention includes products made from the rubber composition disclosed herein.

The elastomer composition of the present invention is particularly suited for use in tires that are intended to bear heavy loads that include truck tires and tires for heavy vehicles. Such tires typically comprise reinforcements which are formed of reinforcing threads or plies of metal wires coated with elastomers. More precisely, these tires comprise, in their bottom zone, one or more bead wires, a carcass reinforcement extending from one bead wire to the other and, in their crown, a crown reinforcement comprising at least two crown plies.

When running under heavy load, the "band" of the carcass (central zone on either side of the median circumferential plane of the tire) is subjected to flexural stresses that may be very high; hence the necessity of imparting a high mechanical strength to this "band". Likewise, the bottom zone of the tire (close to each of the two upturns of the carcass) may be in a zone of operating temperatures that are very high; hence the necessity of imparting reduced hysteresis to this bottom zone. Particular embodiments of the elastomer composition of the present invention are particularly suited for use in the materials that comprise these and other reinforcements within the tire.

Particular embodiments of the elastomer composition of the present invention are also particularly useful as an undertread or tread material of a tire, especially for those tires that are intended to bear a heavy load. For example, an undertread of a tire may be formed of particular embodiments of the elastomer composition to provide a tire having improved rolling resistance and durability. The improved rolling resistance and durability of the tire is achieved due to the physical characteristics of the elastomeric composition that surprisingly provide lower hysteresis while maintaining good rigidity and tear resistance.

The present invention further includes methods for making tires and other products having the elastomer composition in accordance with the present invention. One method includes the steps of mixing the elastomer composition comprising the carbon black characterized in accordance with the present invention, forming one or more tire components comprising the mixed elastomer composition and then assembling the tire that comprises the one or more tire components comprising the mixed elastomer composition. Particular embodiments of the present invention further include curing the tire. Examples of the one or more components include, for example, tread, undertread, carcass, carcass reinforcement and combinations thereof.

The present invention does not include methods for assembling a tire or for curing a tire. One having ordinary skill in the art is knowledgeable of such methods or processes and therefore, a detailed disclosure of such information is neither required nor proper.

The invention is further illustrated by the following examples, which are to be regarded only as an illustration and not delimitative of the invention in any way. The properties of the compositions disclosed in the example are evaluated as described below.

Modulus of Elongation: The moduli of elongation are measured at 10% (M10) at a temperature of 23° C. in accordance with ASTM D412 (1998) on ASTM C test pieces. These are true secant moduli in MPa, that is to say the secant moduli calculated reduced to the real cross-section of the test piece at the given elongation.

Hysteresis Losses (HL): Hysteresis losses are measured in percent by rebound at 60° C. at the sixth impact in accordance with the following equation (3):

$$HL(\%) = 100\{(W_0 - W_1)/W_1\}, \tag{3}$$

wherein $W_0$ is the energy supplied and $W_1$ is the energy restored.

Tear Resistance (TR): The tear resistance indices are measured at 100° C. The breaking load (FRD) is in N/mm of thickness and the elongation at break (ARD) in percentage are measured on a test piece of dimensions 10×142×2.5 mm notched with 3 notches that each have a depth of 3 mm. The tear resistance index is then provided by the following equation (4):

$$TR = (FRD*ARD)/100. \tag{4}$$

Carbon black dispersion (Z note): The carbon black dispersion is measured with a Dispergrader to provide a Z note rating as an indication of the carbon black dispersion in the sample. A higher Z note result indicates better carbon black dispersion in the mixture.

Dynamic Properties: The dynamic characteristics of the materials are measured on an MTS 831 Elastomer Test System in accordance with ASTM D5992. The response of a sample of vulcanized material (cylindrical test piece of a thickness of 4 mm and a section of 400 mm²), subjected to an alternation single sinusoidal shearing stress, at a frequency of 10 Hz and at 80° C., is recorded. Scanning is effected at an amplitude of deformation of 0.1 to 50% (outward cycle), then of 50% to 0.1% (return cycle). The shear modulus G* at 10% deformation in MPa and the maximum value of the tangent of the loss angle tan delta (max tan δ) is determined during the return cycle.

Figure 2:
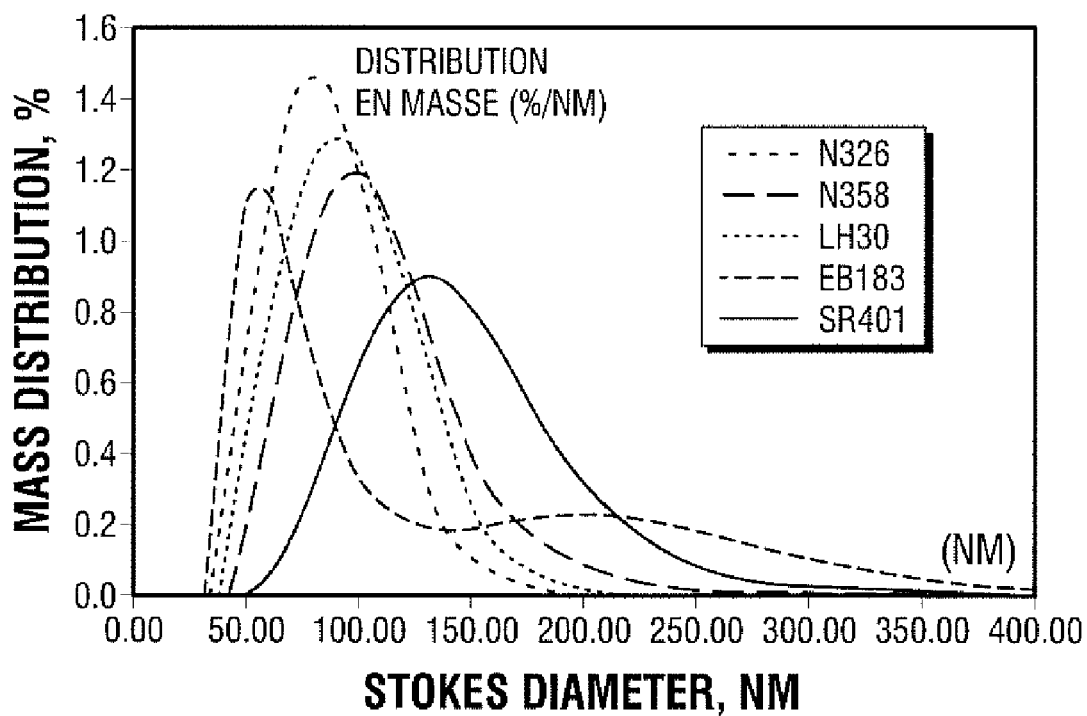
FIG. 2 is a graph of the distribution curves for several carbon blacks that have differing physical properties.

The elastomer compositions used in the examples that follow comprise carbon blacks having the characteristics as disclosed in the Table 2. FIG. 2 is a graph of the distribution curves for several of carbon blacks listed below.

TABLE 2

Physical Characteristics of Selected Carbon Blacks

| Carbon Black | BET | COAN | OAN | IA | $d_w$ | $d_{mode}$ | $d_w/d_{mode}$ | $d_{50}$ | $L/d_{mode}$ |
|---|---|---|---|---|---|---|---|---|---|
| LH30 | 92 | 105 | 132 | 79 | 100 | 93 | 1.08 | 96 | 0.807 |
| N358 | 82 | 110 | 150 | 81 | 115 | 100 | 1.15 | 107 | 0.758 |
| SR401 | 60 | 104 | 167 | 54 | 150 | 129 | 1.16 | 143 | 0.777 |
| N326 | 78 | 69 | 72 | 82 | 89 | 81 | 1.10 | 86 | 0.811 |
| SPHERON 1416* | 53 | 94 | 134 | 62 | 154 | 134 | 1.15 | 145 | 0.782 |
| EB 1830 | 75 | 81 | 89 | 78 | 138 | 57 | 2.42 | 98 | 0.802 |

*Test sample was dispersed during ultrasound treatment with a 600 Watt probe adjusted to 100% of its power.

The LH30 carbon black is available from Continental Carbon of Houston, Tex. The N358, SR401 and N326 carbon blacks are available from Sid Richardson Carbon Company of Fort Worth, Tex. The SPHERON 1416 carbon black is available from Cabot of Alpharetta, Ga. The EB 1830 carbon black is available from Degussa Corporation of Akron, Ohio.

Example 1

This example compares physical properties of an exemplary elastomer composition of the present invention with other elastomer compositions that include silica as filler. Three elastomer formulations were prepared by mixing the components given in Table 3, except for the sulfur and the curing agents, for 2 minutes in a Banbury mixer. The volume of the Banbury mixer was 270 liters for Formulations 2 and 3 and 370 liters for Formulation 1. The sulfur and curing agents were then added on a roll mill. Vulcanization was effected at 150° C. for 25 minutes for Formulations 1 and 2 and for 15 minutes for Formulation 3. The formulations were then tested to measure their physical properties.

The compositions of the formulations are shown in Table 3 as the weight percent of elastomer content. Each of the formulations included a natural rubber as the elastomer of the composition. The carbon blacks in Formulations 1 and 2 were the LH30 and the N358 carbon blacks respectively, having the physical properties as shown in Table 2. The carbon black in Formulation 3 was the SR401 carbon black, which is an exemplary carbon black suitable for use in accordance with the present invention and having the properties as shown in Table 2.

Formulations 1 and 2 included silica as well as a silane coupling agent. The "other" materials that were included in the formulations and are quantified in Table 2 were, in addition to the silane coupling agents, antioxidants, sulfur, curing agents and activators as known to those having ordinary skill in the art.

TABLE 3

Composition Formulations (wt. % of Elastomer Content)

|  | Formulation 1 | Formulation 2 | Formulation 3 |
|---|---|---|---|
| Natural Rubber | 100 | 100 | 100 |
| Carbon Black Type | LH30 | N358 | SR401 |
| Carbon Black Loading | 22 | 42.5 | 42.7 |
| Silica | 25 | 10 | 0 |
| CB/Total Filler (%) | 47 | 81 | 100 |
| Other | 17 | 12.6 | 10.9 |

The physical properties of each of the formulations are shown in Table 4.

TABLE 4

Physical Properties of Composition Formulations

|  | M10 | M100 | HL | TR | Z Note | G* | Max tan δ |
|---|---|---|---|---|---|---|---|
| Formulation 1 | 4.6 | 2.15 | 76 | 91 | 77 | 1.38 | 0.103 |
| Formulation 2 | 4.5 | 2.15 | 100 | 75 | 73 | 1.41 | 0.113 |
| Formulation 3 | 4.4 | 2.09 | 70 | 105 | 84 | 1.32 | 0.091 |

As the results reported in Table 4 show, Formulation 3, which had reinforcement filler that was 100 percent carbon black and no silica as reinforcement filler, had a hysteresis that was lower than the hysteresis of Formulation 1, which had a reinforcement filler comprising 47% carbon black and 53% silica. It also had a lower hysteresis that that of Formulation 2, which had a reinforcement filler comprising 81% carbon black and 19% silica.

By comparison, Formulation 2, as was expected, had a higher hysteresis than the hysteresis of Formulation 1 because of the reduced silica content (~15 phr reduction) used as reinforcement filler in Formulation 2. As the percent silica is decreased in an elastomer formulation, hysteresis typically increases as shown when the hysteresis of Formulation 1 is compared to the hysteresis of Formulation 2.

Formulation 3 provided the surprising results of having 100% carbon black as the reinforcement filler while improving hysteresis over those formulations comprising silica and substantially maintaining or improving both rigidity and tear resistance.

Example 2

This example compares physical properties of an exemplary elastomer composition of the present invention with other elastomer compositions that include different types of carbon blacks as filler. Ten elastomer formulations were prepared using the method described in Example 1 with a Banbury mixer having a volume of 3.5 liters. The mixing time was approximately 4 minutes and curing was effected for 15 minutes at 150° C. The formulations were then tested to measure their physical properties.

Each of the ten formulations had the same basic formulation and differed one from the other only as to type and quantity of carbon black used in the formulations. Five different carbon blacks were used in the formulations at two different loadings. The composition of the basic formulation is shown in Table 5 with the physical characteristics of the carbon blacks shown in Table 2. Table 6 provides the carbon black loadings, as wt. % elastomer content, for each of the formulations.

The physical properties of each of the formulations are shown in Table 7.

TABLE 5

Basic Formulations (wt. % of Elastomer Content)

| Elastomer | Natural Rubber | 100 |
|---|---|---|
| Carbon Black | See Table 6 | See Table 6 |
| Antioxidants | Paraffin | 1 |
| | Flectol Flakes | 1 |
| | Santoflex 13 | 1.5 |
| Cure Activators | SAD | 2.5 |
| | ZNO | 3.0 |
| Curatives | CBS | 1.15 |
| | Sulfur | 1.15 |

TABLE 6

Carbon Blacks Used in Formulations

| | Carbon Black | CB Loading |
|---|---|---|
| Formulation 1 | LH30 | 47 |
| Formulation 2 | | 42 |
| Formulation 3 | N326 | 45 |
| Formulation 4 | | 52 |
| Formulation 5 | SR401 | 45 |
| Formulation 6 | | 50 |
| Formulation 7 | SPHERON 1416 | 45 |
| Formulation 8 | | 52 |
| Formulation 9 | EB183 | 45 |
| Formulation 10 | | 52 |

TABLE 7

Physical Properties of Composition Formulations

| | ME10 | ME100 | HL | TR | Z Note | G* | Max tan δ |
|---|---|---|---|---|---|---|---|
| Formulation 1 | 4.3 | 1.98 | 119 | 116 | 77 | 1.21 | 0.113 |
| Formulation 2 | 3.8 | 1.78 | 100 | 109 | 84 | 0.96 | NA |
| Formulation 3 | 3.6 | 1.55 | 110 | 197 | 71 | 0.99 | 0.102 |
| Formulation 4 | 4.2 | 1.76 | 134 | 247 | 65 | 1.07 | 0.123 |
| Formulation 5 | 4.2 | 2.26 | 98 | 75 | 88 | 1.23 | 0.074 |
| Formulation 6 | 4.7 | 2.51 | 103 | 97 | 79 | 1.31 | 0.084 |
| Formulation 7 | 4.1 | 2.16 | 101 | 62 | 82 | 1.10 | 0.079 |
| Formulation 8 | 4.8 | 2.56 | 110 | 84 | 75 | 1.31 | 0.096 |
| Formulation 9 | 3.4 | 1.68 | 86 | 97 | 80 | 0.98 | 0.063 |
| Formulation 10 | 3.9 | 1.88 | 96 | 145 | 84 | 1.15 | 0.081 |

As may be seen from the test results shown in Table 7, the carbon black used in Formulations 5 and 6 in accordance with the present invention provides the best combination of hysteresis, rigidity and tear resistance when compared to the other formulations having different grades of carbon black.

Example 3

This example compares the performance of two tires. The first tire is a particular embodiment of the present invention having an undertread made with a composition having a carbon black SR401. The second tire is identical except that it has an undertread made with a composition having another carbon black (LH30) as well as silica. The comparison demonstrates the expected improved tire performance of the tire having an undertread made with the composition having the SR401 carbon black due to the surprising physical characteristics of the elastomer compositions demonstrated in Example 1.

Two Michelin XDA-3 tires of size 11R22.5 were manufactured, one having an undertread made with the material of Formulation 1 of Example 1 and one having an undertread made with the material of Formulation 3 of Example 1.

The tires were tested for inflated rolling resistance and temperatures were measured during the testing at both shoulders and at the center. The results are provided in Table 8.

TABLE 8

Tire Testing Results

| | RR (kg/t) | L. Shoulder, ° C. | Center, ° C. | R. Shoulder, ° C. |
|---|---|---|---|---|
| Tire with SR401 CB | 5.85 | 86 | 87.5 | 83.5 |
| Tire with LH30 CB + Silica | 6.01 | 89.5 | 91 | 88 |
| Delta | 0.16 | 3.5 | 3.5 | 4.5 |

As may be seen from the test results, the tire with the undertread made with the SR401 carbon black had lower rolling resistance and operated at a lower temperature than the tire having the undertread made with the LH30 carbon black+silica. Such a result was expected because of the surprising physical properties of the elastomeric composition used in the undertread having the SR401 carbon black in accordance with the present invention.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention, The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention.

It should be understood from the foregoing description that various modifications and changes may be made in the preferred embodiments of the present invention without departing from its true spirit. The foregoing description is provided for the purpose of illustration only and should not be construed in a limiting sense. Only the language of the following claims should limit the scope of this invention.

What is claimed is:

1. A tire, comprising:
   a sidewall, wherein the sidewall comprises a rubber composition, the rubber composition comprising:
   an elastomer selected from one or more natural rubbers, one or more synthetic rubbers or combinations thereof; and
   a carbon black, wherein the carbon black is characterized as having a COAN of between about 97 and 115 ml/100 g, a BET of between 50 and 69 m$^2$/g and a distribution index DI that is greater than 1.15, wherein the DI is a ratio of $d_w$ to $d_{mode}$, an iodine adsorption number of between 50 and 60 mg/g, and an OAN of between 150 and 170 ml/100 g.

2. The tire of claim 1, wherein the distribution index DI is < about 1.60.

3. The tire of claim 1, wherein the carbon black is further characterized as having a ratio of L to $d_{mode}$ between about 0.7 and about 1.5.

4. The tire of claim 3, wherein the ratio of L to $d_{mode}$ is greater than 0.8 and less than 1.2.

5. The tire of claim 1, wherein the BET is between about 57 and 63 m$^2$/g.

6. The tire of claim 1, wherein the one or more synthetic rubbers are selected from styrene butadiene rubber, butadiene rubber, polyisoprene rubber, butyl rubber or combinations thereof.

7. The tire of claim 1, wherein the elastomer composition includes the carbon black in an amount of between about 20 and about 200 pounds per hundred pounds of the elastomer.

8. A tire, comprising:
   a tread, wherein the tread comprises a rubber composition, the rubber composition comprising:
   an elastomer selected from one or more natural rubbers, one or more synthetic rubbers or combinations thereof; and
   a carbon black, wherein the carbon black is characterized as having a COAN of between about 97 and 115 ml/100 g, a BET of between 50 and 69 m$^2$/g and a distribution index DI that is greater than 1.15, wherein the DI is a ratio of $d_w$ to $d_{mode}$, an iodine adsorption number of between 50 and 60 mg/g, and an OAN of between 150 and 170 ml/100 g.

9. The tire of claim 8, wherein the distribution index DI is < about 1.60.

10. The tire of claim 8, wherein the carbon black is further characterized as having a ratio of L to $d_{mode}$ between about 0.7 and about 1.5.

11. The tire of claim 10, wherein the ratio of L to $d_{mode}$ is greater than 0.8 and less than 1.2.

12. The tire of claim 8, wherein the BET is between about 57 and 63 m$^2$/g.

13. The tire of claim 8, wherein the one or more synthetic rubbers are selected from styrene butadiene rubber, butadiene rubber, polyisoprene rubber, butyl rubber or combinations thereof.

14. The tire of claim 8, wherein the elastomer composition includes the carbon black in an amount of between about 20 and about 200 pounds per hundred pounds of the elastomer.

15. A tire, comprising:
   an undertread, wherein the undertread comprises a rubber composition, the rubber composition comprising:
   an elastomer selected from one or more natural rubbers, one or more synthetic rubbers or combinations thereof; and
   between about 20 pounds per hundred pounds of the elastomer (phr) and about 200 phr of a carbon black, wherein the carbon black is characterized as having a COAN of between about 97 and 115 ml/100 g, a BET of between 50 and 69 m$^2$/g and a distribution index DI that is greater than 1.15, wherein the DI is a ratio of $d_w$ to $d_{mode}$, an iodine adsorption number of between 50 and 60 mg/g, and an OAN of between 150 and 170 ml/100 g.

16. The tire of claim 15, wherein the distribution index DI is < about 1.60.

17. The tire of claim 15, wherein the carbon black is further characterized as having a ratio of L to $d_{mode}$ between about 0.7 and about 1.5.

18. The tire of claim 17, wherein the ratio of L to $d_{mode}$ is greater than 0.8 and less than 1.2.

19. The tire of claim 15, wherein the BET is between about 57 and 63 m$^2$/g.

20. The tire of claim 15, wherein the one or more synthetic rubbers are selected from styrene butadiene rubber, butadiene rubber, polyisoprene rubber, butyl rubber or combinations thereof.

* * * * *